(12) United States Patent
Wu et al.

(10) Patent No.: US 10,845,841 B1
(45) Date of Patent: Nov. 24, 2020

(54) DISPLAY APPARATUS

(71) Applicants: Interface Technology (ChengDu) Co., Ltd., Sichuan (CN); Interface Optoelectronics (ShenZhen) Co., Ltd., Guangdong (CN); General Interface Solution Limited, Miaoli County (TW)

(72) Inventors: Chin-Yang Wu, Guangdong (CN); Tsung-Chen Chou, Guangdong (CN); Tsung-Ju Hu, Guangdong (CN); Wen-Hsiao Huang, Guangdong (CN); Yau-Yang Jung, Guangdong (CN)

(73) Assignees: INTERFACE TECHNOLOGY (CHENGDU) CO., LTD., Sichuan (CN); INTERFACE OPTOELECTRONICS (SHENZHEN) CO., LTD., Guangdong (CN); GENERAL INTERFACE SOLUTION LIMITED, Miaoli County (TW)

( * ) Notice: Subject to any disclaimer, the term of this patent is extended or adjusted under 35 U.S.C. 154(b) by 0 days.

(21) Appl. No.: 16/747,546

(22) Filed: Jan. 21, 2020

(30) Foreign Application Priority Data

Oct. 25, 2019 (CN) .......................... 2019 1 1022679

(51) Int. Cl.
*G06F 1/16* (2006.01)
*G02B 1/14* (2015.01)
*G02F 1/1333* (2006.01)
*G06F 3/041* (2006.01)

(52) U.S. Cl.
CPC ............. *G06F 1/1609* (2013.01); *G02B 1/14* (2015.01); *G02F 1/133308* (2013.01); *G06F 3/0412* (2013.01); *G02F 2202/28* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,711,304 | B2* | 4/2014 | Mathew | G06F 1/1601 349/110 |
| 8,848,350 | B2* | 9/2014 | Kim | G06F 3/041 361/679.21 |
| 9,084,338 | B2* | 7/2015 | Gu | H05K 5/02 |
| 9,151,978 | B2* | 10/2015 | Tsurusaki | G06F 1/1643 |
| 9,201,459 | B2* | 12/2015 | Lee | G06F 1/1656 |
| 9,258,912 | B2* | 2/2016 | Cheon | H05K 5/0017 |
| 9,258,920 | B2* | 2/2016 | Arheit | H05K 7/00 |
| 9,268,165 | B2* | 2/2016 | Lin | G02F 1/13338 |

(Continued)

*Primary Examiner* — Lisa Lea-Edmonds
(74) *Attorney, Agent, or Firm* — CKC & Partners Co., LLC

(57) ABSTRACT

A display apparatus includes a display module, a cover, a connecting element and an optical adhesive. The cover is disposed over the display module, and includes a cover portion and an adhesive-restricting portion. The adhesive-restricting portion is protruded from a periphery of a bottom side of the cover portion. The adhesive-restricting portion includes a lower surface facing a surface of the display module. The connecting element is connected between the lower surface of the adhesive-restricting portion and the surface of the display module, and defines an accommodating space together with the cover and the display module. The optical adhesive is disposed in the accommodating space.

17 Claims, 3 Drawing Sheets

(56) References Cited

U.S. PATENT DOCUMENTS

| | | | |
|---|---|---|---|
| 9,467,541 B2* | 10/2016 | Tanaka | G06F 1/1626 |
| 9,872,407 B2* | 1/2018 | Inobe | G06F 1/1643 |
| 9,910,304 B2* | 3/2018 | Kao | G02F 1/133305 |
| 9,949,036 B2* | 4/2018 | Ozasa | H04R 17/005 |
| 10,082,693 B2* | 9/2018 | Son | G02F 1/133308 |
| 10,088,871 B2* | 10/2018 | Cheng | G06F 1/1656 |
| 10,098,245 B2* | 10/2018 | Lin | H05K 5/0017 |
| 10,191,315 B2* | 1/2019 | Jean | G02F 1/133308 |
| 10,241,549 B2* | 3/2019 | Uto | G06F 1/203 |
| 10,356,917 B2* | 7/2019 | Lee | H05K 5/0017 |
| 10,598,974 B2* | 3/2020 | Shimojo | G02F 1/133308 |
| 2014/0111927 A1* | 4/2014 | Raff | G06F 1/1656 |
| | | | 361/679.21 |
| 2015/0062460 A1* | 3/2015 | Yamada | H05K 5/03 |
| | | | 349/12 |
| 2015/0138487 A1* | 5/2015 | Hirayama | G02F 1/1336 |
| | | | 349/65 |
| 2015/0305173 A1* | 10/2015 | Hamada | G06F 1/1656 |
| | | | 361/679.01 |
| 2017/0045766 A1* | 2/2017 | Makino | G02B 6/0088 |
| 2017/0090637 A1* | 3/2017 | Yoon | G06F 3/0414 |
| 2018/0045881 A1* | 2/2018 | Gotou | G02B 6/005 |
| 2018/0317000 A1* | 11/2018 | Ham | H04R 9/06 |
| 2019/0006615 A1* | 1/2019 | Jung | H01L 27/323 |
| 2019/0212606 A1* | 7/2019 | Koda | G02B 6/0088 |
| 2019/0334118 A1* | 10/2019 | Jung | H01L 51/529 |
| 2020/0026117 A1* | 1/2020 | Teramoto | G09G 3/36 |
| 2020/0209671 A1* | 7/2020 | Liau | H05K 5/0017 |

\* cited by examiner

DISPLAY APPARATUS

CROSS-REFERENCE TO RELATED APPLICATION

This application claims priority to China application No. 201911022679.3 filed on Oct. 25, 2019, which is herein incorporated by reference in its entirety.

BACKGROUND

Field of Invention

The present disclosure relates to a display apparatus, and more particularly, to a display apparatus having a cover that is integrated to a frame for adhesive filling.

Description of Related Art

Optical adhesives, such as optical clear resins (OCR), are special adhesives designed for the binding of transparent optical components. The optical adhesive fills a gap formed between a panel and a transparent cover to enhance a contrast of a display apparatus. Compared with a traditional air gap method, the optical adhesive can reduce light scattering caused by external illumination or backlight, and is suitable for adhering and assembly between touch screens, large-size glass substrates, or other soft boards and hard boards.

In a conventional adhesive filling operation of the display apparatus, it is necessary to provide an external frame as a frame for adhesive filling, and then an optical adhesive (for example, an optical transparent resin) can be injected into a space formed between the external frame and the cover. However, the external frame itself has size tolerances, and especially when it is attached to a 3D cover, a gap at an adhering location is easily generated, such that the optical adhesive leaks through a joint between the external frame and the cover. In addition, a material requirement of the external frame and an assembly procedure between the external frame and the cover are also a burden on a process of the display apparatus.

SUMMARY

An object of the disclosure is to provide a display apparatus, in which a cover includes a cover portion and an adhesive-restricting portion, such that the cover can achieve a function of a frame for adhesive filling and a function of a cover plate simultaneously, thereby omitting an assembly procedure of the cover with the conventional frame for adhesive filling, avoiding leaking of an adhesive during an adhesive filling process, and enhancing a process yield and product competitiveness.

According to the object of the present disclosure, a display apparatus is provided, and includes a display module, a cover, a connecting element and an optical adhesive. The cover is disposed over the display module, and includes a cover portion and an adhesive-restricting portion. The adhesive-restricting portion is protruded from a periphery of a bottom side of the cover portion. The adhesive-restricting portion includes a lower surface facing a surface of the display module. The connecting element is connected between the lower surface of the adhesive-restricting portion and the surface of the display module, and defines an accommodating space together with the cover and the display module. The optical adhesive is disposed in the accommodating space.

In some embodiments, the surface of the display module is a surface of a display panel of the display module, a surface of a touch panel of the display module, a surface of a touch structure of the display module, a surface of an optical film of the display module, or a surface of a frame member of the display module.

In some embodiments, the cover is a flat plate structure or a curved plate structure.

In some embodiments, the adhesive-restricting portion is an annular structure.

In some embodiments, the lower surface of the adhesive-restricting portion is parallel to the surface of the display module.

In some embodiments, the connecting member is a double-sided tape.

In some embodiments, the optical adhesive is an optical clear resin.

In some embodiments, the adhesive-restricting portion comprises at least one rib reinforcement structure, and the rib reinforcement structure is located on an inner side of the adhesive-restricting portion and contacts the optical adhesive.

In some embodiments, the adhesive-restricting portion comprises at least one rib reinforcement structure, and the rib reinforcement structure is located on an outer side of the adhesive-restricting portion.

In summary, the cover of the display apparatus according to embodiments of the present disclosure includes the cover portion and the adhesive-restriction portion protruding from the periphery of the bottom side of the cover portion, such that a function of a frame for adhesive filling and a function of a cover plate are simultaneously achieved by one single cover. The adhesive-restricting portion of the cover of embodiments of the present disclosure directly protrudes from the cover portion, and there is no gap between the cover portion and the adhesive-restricting portion, such that a situation of the prior art, in which an adhesive leaks from a joint between the frame for adhesive filling and the cover, can be avoided. In addition, the display apparatus of embodiments of the present disclosure not only can decrease a material requirement of the frame for adhesive filling, but also can omit a connecting procedure between the frame for adhesive filling and the cover. Therefore, the display apparatus of the present disclosure can simplify a process, and enhance a yield and product competitiveness.

In order to make the above features and advantages of the present disclosure more apparent, the following embodiments are described in detail with reference to the accompanying drawings.

BRIEF DESCRIPTION OF THE DRAWINGS

Aspects of the present disclosure are best understood from the following detailed description in conjunction with the accompanying figures. In accordance with the standard practice in the industry, various features are not drawn to scale. In fact, the dimensions of the various features can be arbitrarily increased or reduced for clarity of discussion.

DETAILED DESCRIPTION

Figure 1:
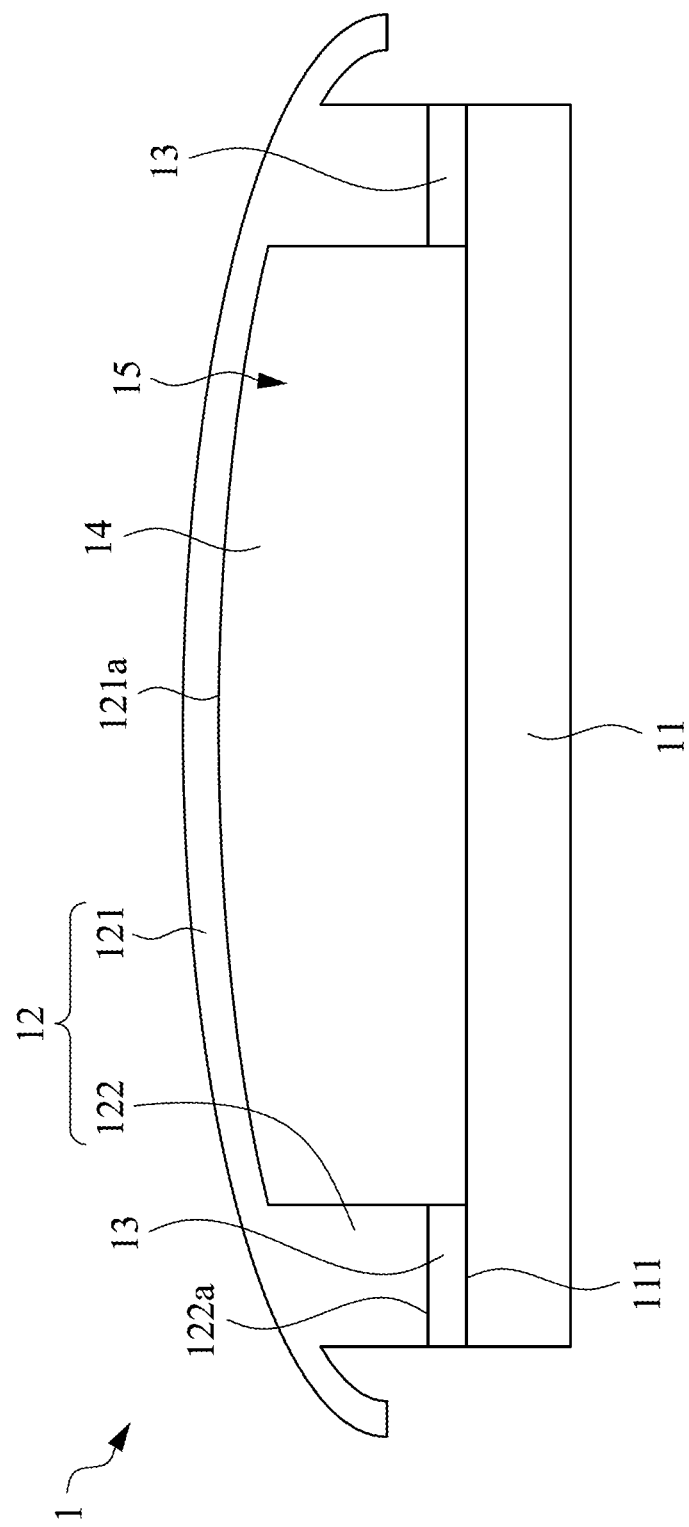
FIG. 1 is a schematic cross-sectional view of a display apparatus according to embodiments of the present disclosure.

The embodiments of the present disclosure are discussed in detail below. However, it will be appreciated that the embodiments provide many applicable concepts that can be implemented in various specific contents. The embodiments discussed and disclosed are for illustrative purposes only and are not intended to limit the scope of the present disclosure. All of the embodiments of the present disclosure disclose various different features, and these features may be implemented separately or in combination as desired. In addition, the terms "first", "second", and the like, as used herein, are not intended to mean a sequence or order, and are merely used to distinguish elements or operations described in the same technical terms. Furthermore, the spatial relationship between two elements described in the present disclosure applies not only to the orientation depicted in the drawings, but also to the orientations not represented by the drawings, such as the orientation of the inversion. Moreover, the terms "connected", "coupled", "electrically connected" or the like between two components referred to in the present disclosure are not limited to the direct connection, coupling, or electrical connection of the two components, and may also include indirect connection, coupling, or electrical connection as required.

FIG. 1 is a schematic diagram of a display apparatus 1 according to embodiments of the present disclosure. The embodiments of the present disclosure do not limit the type of the display apparatus 1, and the display apparatus 1 may be a flat display apparatus or a curved display apparatus, or a 2D display apparatus or a 3D display apparatus.

As shown in FIG. 1, the display apparatus 1 includes a display module 11, a cover 12, a connecting member 13, and an optical adhesive 14. The display module 11 may be, for example but not limited to, a liquid crystal display module (LCM). Generally, the liquid crystal display module includes a liquid crystal display panel, a backlight module, driving components, frame members, etc. In other embodiments, a configuration of the display module 11 may be adjusted according to requirements. For example, the display module may further include a touch panel (film), or the display panel of the display module includes a touch structure, or an optical film is provided on the display surface of the display module, or the like. The display module 11 may be a display module other than the liquid crystal display module, such as a light emitting diode (LED) display module or an organic LED display module. Moreover, as shown in FIG. 1, the display module 11 includes a surface 111.

Referring to FIG. 1 continuously, the cover 12 is disposed over the display module 11, specifically over the surface 111 of the display module 11. The cover 12 includes a cover portion 121 and an adhesive-restricting portion 122. The cover portion 121 may be a flat plate structure or a curved plate structure, and the curved plate structure is used as an example herein. The adhesive-restricting portion 122 may protrude from a periphery of a lower side surface 121a of the cover portion 121, that is the adhesive-restricting portion 122 extends from the lower side surface 121a of the cover portion 121 toward the surface 111 of the display module 11. In an embodiment, the periphery of the lower side surface 121a of the cover portion 121 refers to an outer region of the lower side surface 121a. For example, when the cover 12 is disposed over the surface 111 of the display module 11, the periphery of the lower side surface 121a of the cover portion 121 corresponds to an area outside a display area of the display module 11. The adhesive-restricting portion 122 may include a lower surface 122a facing the surface 111 of the display module 11. In an example, the lower surface 122a of the adhesive-restricting portion 122 may be a flat surface or a curved surface, and the flat surface is used as an example herein. In the other examples, the lower surface 122a of the adhesive-restricting portion 122 may be an inclined surface, and the lower surface 122a preferably has a smaller inclined angle. The adhesive-restricting portion 122 of the present embodiment is an annular structure, such that the adhesive-restricting portion 122 can form a sealed space with the display module 11 when the adhesive-restricting portion 122 is connected to the display module 11.

As shown in FIG. 1, the connecting element 13 is connected between the lower surface 122a of the adhesive-restricting portion 122 and the surface 111 of the display module 11, such that the connecting element 13, the cover 12 and the display module 11 can form an accommodating space 15. The connecting element 13 is, for example but not limited to, a double-sided tape. The optical adhesive 14 may fill in the accommodating space 15. The optical adhesive 14 of this present embodiment is an optical clear resin for example. In some examples, the lower surface 122a of the adhesive-restricting portion 122 may be a flat surface parallel to the surface 111 of the display module 11, such that a reliability of a connecting process of connecting the connecting member 13 to the lower surface 122a of the adhesive-restricting portion 122 and the surface 111 of the display module 11 is enhanced.

As the display module 11 is varied in configuration, the surface 111 of the display module 11 connected to the connecting element 13 may be varied. For example, the surface 111 of the display module 11 may be a surface of the display panel of the display module, such as the surface of the display panel closest to the cover 12, and the display panel may be an open cell which does not have a front iron frame. In one embodiment, the surface 111 of the display module 11 may be a surface of the touch panel of the display module, in which the touch panel is attached to the display panel and is adjacent to the cover 12. In one embodiment, the surface 111 of the display module 11 may be a surface of the touch structure of the display panel, and the touch structure is located on one side of the display panel adjacent to the cover 12. In one embodiment, the surface 111 of the display module 11 may be a surface of the optical film which is attached to the display panel or the touch panel (film) of the display module 11 and adjacent to the cover 12. In an embodiment, the surface 111 of the display module 11 may be a surface of a frame member of the display module 11, and the frame member may be a front iron frame for example.

Figure 2:
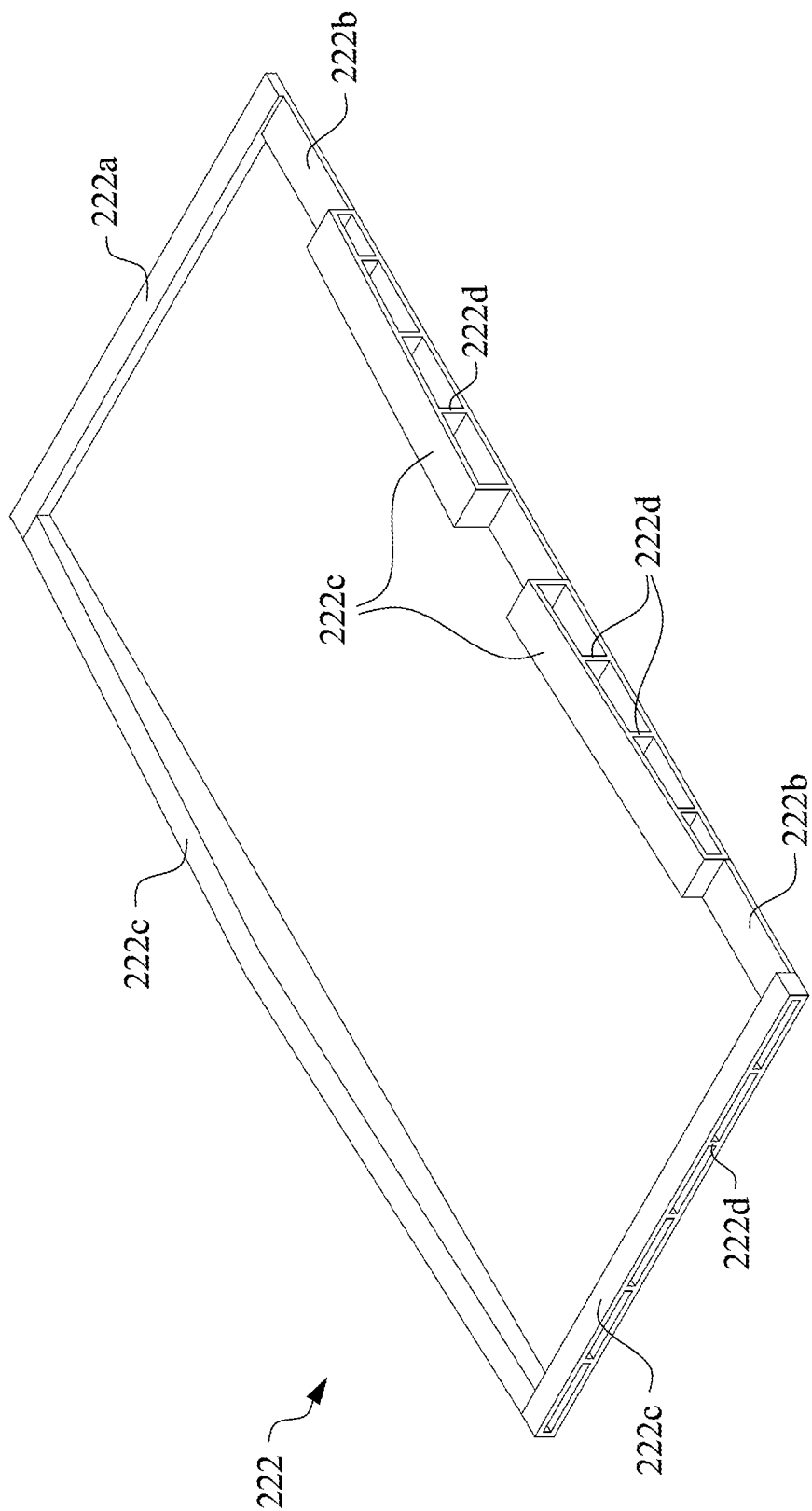
FIG. 2 is a schematic perspective diagram of an adhesive-restricting portion of a cover according to embodiments of the present disclosure.

FIG. 2 is a schematic perspective diagram of another adhesive-restricting portion 222 of the cover according to embodiments of the present disclosure, and the adhesive-restricting portion 222 may include the technical features of the adhesive-restricting portion 122 of FIG. 1. In addition, as shown in FIG. 2, the adhesive-restriction portion 222 includes some 3D features, such as a flat portion 222a, a recessed portion 222b, and/or a raised portion 222c, and the 3D features may be adjusted according to product design requirements. Furthermore, the adhesive-restricting portion 222 may further include at least one rib reinforcement structure 222d, the rib reinforcement structure 222d may be located on an inner side or an outer side of the adhesive-restricting portion 222, and is located on the outer side herein as an example. In the embodiment, the rib reinforcement structure 222d is located at the raised portion 222c for example. The rib reinforcement structure 222d can enhance the overall structural strength. Although FIG. 2 only shows the adhesive-restricting portion 222 of the cover, the adhesive-restricting portion 222 is actually integrally formed with the cover portion which is not shown by, for example, injection molding.

Figure 3:
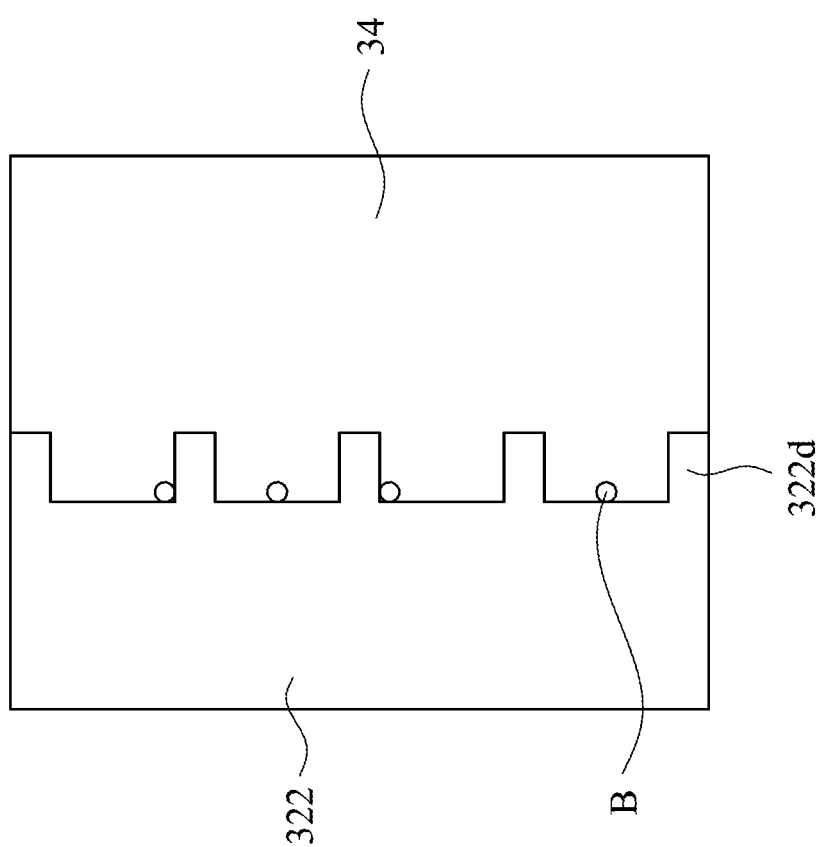
FIG. 3 is a schematic cross-sectional view of a rib reinforcement structure according to embodiments of the present disclosure.

FIG. 3 is a schematic diagram of another rib reinforcement structure 322d according to embodiments of the disclosure. As shown in FIG. 3, the rib reinforcement structure 322d is located on an inner side of an adhesive-restricting portion 322 of a cover, such that an optical adhesive 34 may fill into the rib reinforcement structure 322d. In addition to enhancing the overall structural strength, the rib reinforcement structure 322d also brings other effects. The optical adhesive 34 flows into the rib reinforcement structure 322d, such that connection between them increases a structural strength of connecting between the optical adhesive 34 and the cover, thereby reducing a peeling problem of the optical adhesive 34 and the cover. The injected optical adhesive 34 may generate bubbles B. When the bubbles B are generated, the bubbles B may hide within the rib reinforcement structure 322d, such that display quality of the display apparatus will not be affected. The bubbles B may include adhesive filling bubbles and/or surrounding side bubbles.

As can be seen from the above description, the cover of the display apparatus according to embodiments of the present disclosure includes the cover portion and the adhesive-restriction portion protruding from the periphery of the bottom side of the cover portion, such that a function of a frame for adhesive filling and a function of a cover plate are simultaneously achieved by one single cover. The adhesive-restricting portion of the cover of embodiments of the present disclosure directly protrudes from the cover portion, and there is no gap between the cover portion and the adhesive-restricting portion, such that a situation of the prior art, in which an adhesive leaks from a joint between the frame for adhesive filling and the cover, can be avoided. In addition, the display apparatus of embodiments of the present disclosure, not only can decrease a material requirement of the frame for adhesive filling, but also can omit a connecting procedure between the frame for adhesive filling and the cover. Therefore, the display apparatus of the present disclosure can simplify a process, and enhance a yield and product competitiveness.

The features of several embodiments are outlined above, so those skilled in the art can understand the aspects of the disclosure. Those skilled in the art will appreciate that the present disclosure can be readily utilized as a basis for designing or modifying other processes and structures, thereby achieving the same objectives and/or achieving the same advantages as the embodiments described herein. Those skilled in the art should also understand that these equivalent constructions do not depart from the spirit and scope of the present disclosure, and they can make various changes, substitutions and alteration without departing from the spirit and scope of this disclosure.

What is claimed is:

1. A display apparatus, comprising:
   a display module;
   a cover disposed over the display module, wherein the cover comprises a cover portion and an adhesive-restricting portion, the adhesive-restricting portion is protruded from a periphery of a bottom side surface of the cover portion, and the adhesive-restricting portion comprises a lower surface facing a surface of the display module;
   a connecting element connected between the lower surface of the adhesive-restricting portion and the surface of the display module, wherein the bottom side surface of the cover portion, the surface of the display module, and the connecting element enclose an accommodating space; and
   an optical adhesive filling the accommodating space.

2. The display apparatus of claim 1, wherein the surface of the display module is a surface of a display panel of the display module, a surface of a touch panel of the display module, a surface of a touch structure of the display module, a surface of an optical film of the display module, or a surface of a frame member of the display module.

3. The display apparatus of claim 1, wherein the cover is a flat plate structure or a curved plate structure.

4. The display apparatus of claim 1, wherein the adhesive-restricting portion is an annular structure.

5. The display apparatus of claim 1, wherein the lower surface of the adhesive-restricting portion is parallel to the surface of the display module.

6. The display apparatus of claim 1, wherein the connecting member is a double-sided tape.

7. The display apparatus of claim 1, wherein the optical adhesive is an optical clear resin.

8. The display apparatus of claim 1, wherein the adhesive-restricting portion comprises at least one rib reinforcement structure, and the rib reinforcement structure is located on an inner side of the adhesive-restricting portion and contacts the optical adhesive.

9. The display apparatus of claim 1, wherein the adhesive-restricting portion comprises at least one rib reinforcement structure, and the rib reinforcement structure is located on an outer side of the adhesive-restricting portion.

10. A display apparatus, comprising:
    a display module;
    a cover disposed over the display module, wherein the cover comprises a cover portion and an adhesive-restricting portion, the adhesive-restricting portion is protruded from a periphery of a bottom side surface of the cover portion, the adhesive-restricting portion comprises a lower surface facing a surface of the display module, and the lower surface of the adhesive-restricting portion is parallel to the surface of the display module;
    a connecting element connected between the lower surface of the adhesive-restricting portion and the surface of the display module, and defining an accommodating space together with the cover and the display module; and
    an optical adhesive disposed in the accommodating space.

11. The display apparatus of claim 10, wherein the surface of the display module is a surface of a display panel of the display module, a surface of a touch panel of the display module, a surface of a touch structure of the display module, a surface of an optical film of the display module, or a surface of a frame member of the display module.

12. The display apparatus of claim 10, wherein the cover is a flat plate structure or a curved plate structure.

13. The display apparatus of claim 10, wherein the adhesive-restricting portion is an annular structure.

14. The display apparatus of claim 10, wherein the connecting member is a double-sided tape.

15. The display apparatus of claim 10, wherein the optical adhesive is an optical clear resin.

16. The display apparatus of claim 10, wherein the adhesive-restricting portion comprises at least one rib reinforcement structure, and the rib reinforcement structure is located on an inner side of the adhesive-restricting portion and contacts the optical adhesive.

17. The display apparatus of claim 10, wherein the adhesive-restricting portion comprises at least one rib reinforcement structure, and the rib reinforcement structure is located on an outer side of the adhesive-restricting portion.

* * * * *